May 5, 1959   V. WEBER   2,885,151
TEMPERATURE CONTROL FOR COOKING APPLIANCES
Filed June 7, 1955
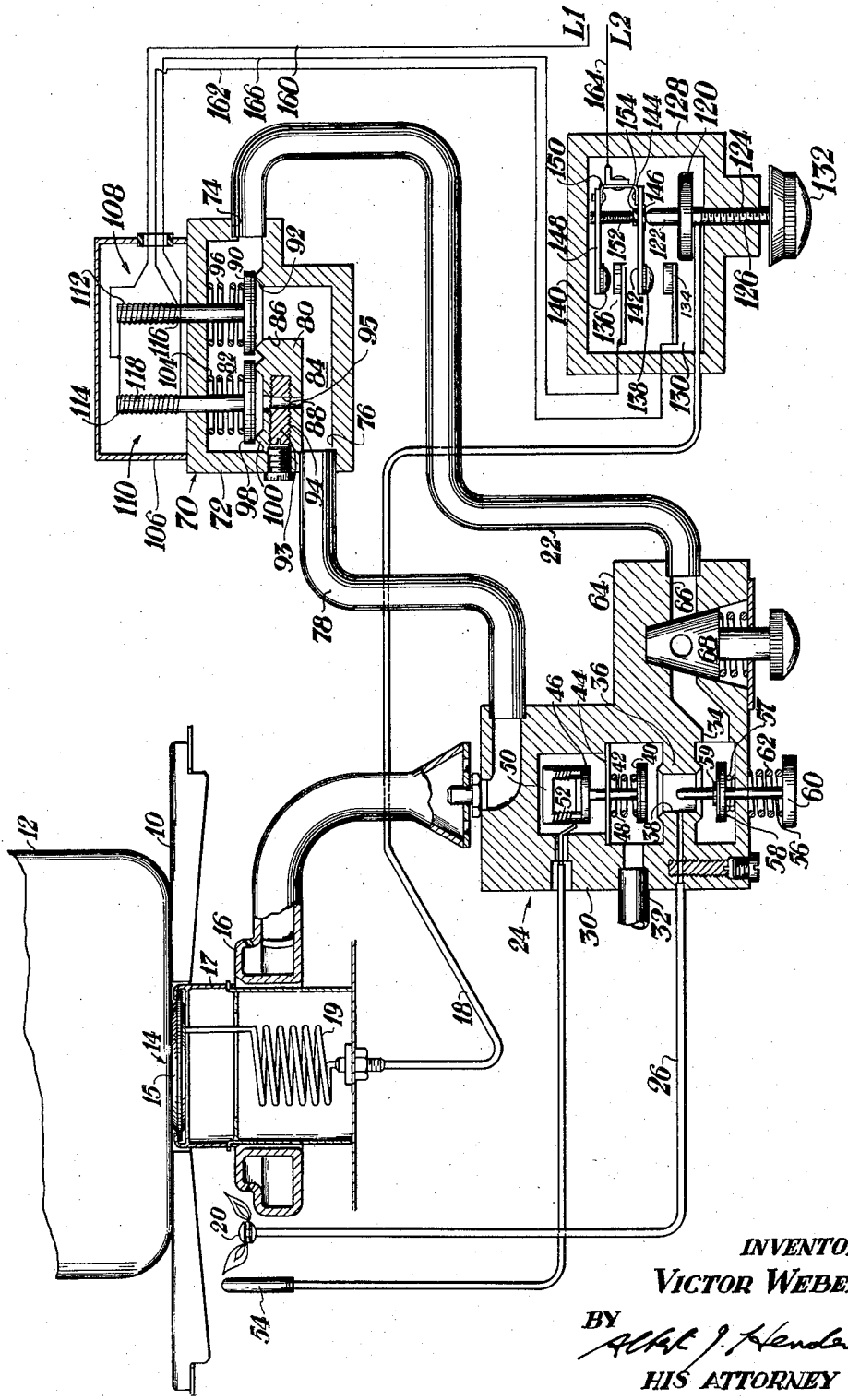
INVENTOR.
VICTOR WEBER
BY
HIS ATTORNEY

2,885,151
TEMPERATURE CONTROL FOR COOKING APPLIANCES

Victor Weber, Greensburg, Pa., assignor to Robertshaw-Fulton Controls Company, Greensburg, Pa., a corporation of Delaware Application June 7, 1955, Serial No. 513,761

2 Claims. (Cl. 236—32)

This invention relates to an improved control mechanism for regulating the heat output of a heating unit, and more particularly, a top burner of a gas range.

It is a principal object of this invention to automatically regulate the heat output of the top burner to maintain a cooking vessel, supported thereon, at a desired temperature.

Many foods require rapid initial heating to bring the food to a predetermined temperature and thereafter require a reduced amount of heat input to maintain such predetermined temperature. It is an object of this invention to effect such a cooking operation by permitting the top burner to operate at full energy input until the temperature of the food to be cooked reaches a predetermined value, and then reducing the fuel supply to the burner to maintain the food at the proper temperature.

In accordance with the present invention, a control mechanism is provided which will thermostatically regulate temperature of the contents of a cooking vessel when placed on a surface burner of a gas range or similar class and purpose gas appliance, by limiting the cooking vessel temperature through controlled gas flow through the associated burner.

In a preferred embodiment, a dual solenoid valve unit having tandem or parallel gas passageways is provided for supplying fuel to the surface burner. The two feeds are so arranged as to provide full or maximum heating rate as soon as the burner is turned "on" and a temperature setting of the control is made. Mechanism is also provided for thermostatically breaking a circuit to one of the solenoid valves as the cooking vessel approaches a selected temperature or control setting, thus reducing the supply of fuel to the burner. Upon obtaining the desired cooking temperature, the thermostatically operated mechanism opens a second circuit to the other solenoid valve for terminating fuel flow to the burner. Thereafter, the other solenoid valve is thermostatically actuated between open and closed positions to maintain the cooking vessel at the desired temperature.

Other objects and advantages will become apparent from the following description taken in connection with the accompanying drawing which is a schematic view of a control system for a fuel burner embodying this invention, portions thereof being shown in section.

Referring more particularly to the drawing, there is shown an annular surface heating grate or spider 10 which is adapted to be supported on the top plate of a gas range (not shown) in a manner well known in the art. The grate or spider 10 is adapted to support a cooking vessel 12 thereon and is provided with the usual opening in the center thereof for accommodating a temperature sensing element 14 which is mounted on the range by any suitable means. Disposed beneath the grate 10 and encircling the sensing element 14 is a gas burner 16 which may be supported on the gas range by any suitable means. It will be understood that the grate 10 may be replaced or interchangeable with a griddle, the temperature of which may be similarly sensed by the element 14.

The sensing element 14 takes the form of a cylindrical container 17 for housing a temperature sensing bulb 15 which communicates with the capillary tube 18. The tube 18 is formed with a coil 19 and serves to bias the bulb 15 toward the cooking vessel 12.

The burner 16 is provided with a pilot burner 20 located in lighting proximity thereto. The flow of fuel is conducted to the burner 16 by a main fuel pipe 22 under control of an automatic pilot control and gas shutoff cock 24 to which a conduit 26 for supplying fuel to the pilot burner 20 is connected.

The device 24 comprises a hollow casing 30 having an inlet 32 and an outlet 34 to which opposite ends of the main fuel pipe 22 are connected respectively. A partition 36 extending across the interior of the casing 30 serves to separate the inlet 32 from the outlet 34 so that flow of fuel therebetween is permitted only by way of an axial opening 38 formed in the partition 36.

The flow of fuel through the opening 38 is under control of a control means shown as a valve member 40 which is adapted to be seated on the side of the partition 36 adjacent the inlet 32. The valve member 40 is provided with a stem 42 which extends through an apertured partition 44 and carries an armature member 46 on its projecting end. A coil spring 48 is operative between the valve member 40 and the apertured partition 44 for biasing the valve member 40 toward its seat on the partition 36 to establish the closed position of the valve member 40.

The armature 46 forms part of an electromagnetic means and is adapted for movement between the attracted and released positions relative to the pole faces of a horseshoe magnet 50 according to the energization or deenergization respectively of a winding 52 associated with the magnet 50. Due to the provision of the coil spring 48, the armature 46 is biased to its released position and resetting means to be described hereinafter are employed to place it in the attracted position. The winding 52 is energized by thermoelectric current generated by a thermocouple 54 which is electrically connected to the winding 52 and is located to be heated by a flame at the pilot burner 20. It will be understood that the energy so generated is insufficient to attract the armature 46 from its released position but is sufficient to retain it in the attracted position upon completion of the resetting operation.

The reset means comprises a reset stem 56 which extends exteriorly of the casing 30 at the end opposite the magnet 50. The inner end of the reset stem 56 extends axially through the opening 38 and terminates adjacent the valve member 40. A closure disk 58 is carried on the reset stem 56 for seating upon the under side of the partition 36 to interrupt the flow of fuel through the opening 38 when the valve member 40 is disengaged from its seat during the resetting operation. The reset stem 56 is provided with a momentary contact push button 60 positioned exteriorly of the casing 30. A coil spring 62 is operative between the push button 60 and the under side of the casing 30 to retain the reset stem 56 in an outward projected position with the closure disk 58 spaced from the partition 36. An override spring 57 is held in compression between the valve member 58 and a wall of the control device 24 and serves to bias the valve member 58 against a stop 59 secured to the stem 56 while allowing further longitudinal movement of the stem 56 to effect unseating of the valve member 40 after the valve member 58 has been seated.

Ignition of the pilot burner 20 is initiated by manually depressing the push button 60. Such operation serves to position the valve member 58 on to its seat and the armature 46 against the pole faces of the magnet 50. Due to the seating of the closure disk 58 on the partition 36, the flow of fuel to the outlet 34 is interrupted during this resetting operation. The unseating of the valve member 40 allows fuel to flow through the conduit 26 to the pilot burner 20 where flame is established by any suitable means such as by a lighted match. The thermocouple 54 becomes heated by the flame at the pilot burner 20, thus energizing the winding 52 sufficiently to retain the armature 46 in its attracted position. The push button 60 and the reset stem 56 are returned to their outward projected position upon release of the manual pressure thereon, whereupon the closure disk 58 no longer prevents flow of fuel to the outlet 34. Since the valve member 40 is now retained in its open position due to the operation of the electromagnetic means, the passage of fuel between the inlet 32 and the outlet 34 is now established.

It will be apparent that any other suitable pilot burner may be used, such, for example, a simple constantly burning pilot burner, without departing from the spirit of the invention. In using a constantly burning pilot burner, the adjustable shutoff cock 68 would be separately installed in the fuel pipe 2 to control the flow of fuel therethrough.

As shown in the drawing, an extension 64 projects laterally of the casing 30 and has a passageway 66 formed therein for communication with the outlet 34. Flow of fuel through the passageway 66 is controlled by a flow adjusting and shutoff cock 68 and is directed into the main fuel pipe 22 for a purpose to be presently described.

Interposed between the automatic pilot control device and gas cock 24 and the surface burner 16 is a dual solenoid valve assembly generally indicated by the reference numeral 70 and comprising a valve housing 72 having an inlet opening 74 and an outlet opening 76. The inlet opening 74 is adapted to receive the end of the conduit 22, and the outlet 76 is adapted to receive the end of a conduit 78 leading to the surface burner 16.

The interior of the housing 72 is hollow and is provided with a longitudinally extending partition wall 80 which separates an inlet chamber 82 in communication with the inlet 74 and an outlet chamber 84 in communication with the outlet 76. The partition wall 80 is provided with an opening 86 and a reduced opening 88 longitudinally spaced from the opening 86 with respect to the housing 72. The flow of fuel through the opening 86 is controlled by a main valve member 90 which is adapted to engage a seat 92 formed in the upper surface of the wall 80. The valve member 90 is biased to a closing position by a coil spring 96 operatively disposed between the top surface of the valve member 90 and an internal surface of the casing 72.

Similarly, the flow of fuel through the opening 88 is controlled by a valve member 98 which is engageable with a seat 100 formed in the upper surface of the wall 80. The valve member 98 is biased in a valve closing position by a coil spring 104 operatively interposed between the valve member 98 and the casing 72.

As previously stated, the opening 88 is somewhat smaller than the opening 86, and may be varied by an adjusting rod 93 threadedly received in a tapped bore 94 formed in the casing 72. The rod 93 is provided with a passageway 95 which when aligned with the opening 88, as shown in the drawing, permits maximum flow of fuel through the opening 88. Axial adjustment of the rod 93, by rotation of the same, moves the passageway out of alignment with the opening 88 thereby restricting the flow of fuel through the opening 88. In this manner, the differential between the rates of flow of fuel through the openings 86 and 88 may be varied to accomplish a result which will be apparent from the operation of the invention to be described hereinafter.

Mounted on the casing 72 is a solenoid housing 106 which encases a pair of solenoids generally indicated by the reference numerals 108, 110 comprising coils 112, 114 and armatures 116, 118, respectively. As shown in the drawing, the armatures 116 and 118 are secured to the valve members 90 and 98, respectively, for a purpose to be described hereinafter. Energization of the solenoids 108, 110 for actuating the valve members 90, 98 between their various controlling positions is accomplished by a thermostatically controlled switch to be presently described.

The capillary tube 18 communicates with an expansible power element 120 which may consist of a pair of flexible diaphragms welded together at their periphery and carrying a thrust button 122 on one side thereof. The other side of the power element 120 is supported by a stud 124 which is threaded through a suitable aperture 126 formed in a wall of a casing 128 to mount the power element 120 within a chamber 130 formed in the casing 128. One end of the stud 124 projects out of the casing 128 and carries a manually operable knob or dial 132 which may be manipulated to rotate the stud 124 and thus effect axial adjustment of the power element 120 relative to the casing 128.

The assembly of the bulb 15 within the sensing element 14, the capillary tube 18 and the expansible power element 120 is filled with a suitable thermal fluid which will expand upon increase in temperature sensed by the bulb to effect expansion of the power element 120.

Disposed within the chamber 130 is a pair of spaced superposed fixed contacts 134, 136 which are engageable respectively by a pair of movable contacts 138, 140. The movable contact 138 is carried on the free end of a switch arm 142 which is pivoted at its other end by a flexure plate 144 secured to the casing 128 by any suitable means. The movable contact 138 overlies the thrust button 122 of the power element 120 and carries a block of insulating material 146 which is engageable by the button 122. The flexure plate 144 serves to bias the switch arm 142 in a counter-clockwise direction, as viewed in the drawing, and thus bias the movable contact 138 toward the stationary contact 134.

The movable contact 140 is carried on one end of a switch arm 148 and is pivoted at its other end by a flexure plate 150 secured to the casing 128 by any suitable means. The flexure plate 150 serves to bias the switch arm 148 in a counterclockwise direction to bias the movable contact 140 toward the stationary contact 136. Abutment means is provided for transmitting movement from the switch arm 142 to the switch arm 148 for a purpose which will more fully appear hereinafter. This means takes the form of a screw 152 threaded through the switch arm 148 and extending toward the switch arm 142 to be engageable by an insulating block 154 carried by the switch arm 142.

The electrical connections and fuel transmitting means between the various parts of the control system will be brought out in a description of the operation of the apparatus which now follows.

*Operation*

As shown, the apparatus is in the "off" position with no fuel being supplied to the surface burner 16, but fuel is being supplied to the pilot burner 20 for allowing fuel to flow through the opening 38. To place the apparatus in operation, the shutoff cock 68 is turned to the "on" position and the dial 132 is rotated to a desired temperature setting. Such rotation of the dial 132 will serve to screw the stud 124 out of the casing 128 and move the power element 120 downward, thereby permitting the movable contacts 138, 140 to move into engagement with the fixed contacts 134, 136, respectively, as shown in the drawing.

The apparatus is thus conditioned to supply electrical energy to the solenoid coil 112 through a circuit which may be traced as follows: From line wire L1 of a suitable two-line power source through wire 160, solenoid coil 112, wire 162, fixed contact 134, movable contact 138, movable arm 142, and wire 164 to line wire L2. Similarly, electrical energy is supplied to the coil 114 of the solenoid 110 through a parallel circuit which may be traced as follows: From line wire L1 through wire 160, solenoid coil 114, wire 166, contacts 136, 140, movable arm 148, and wire 164 to line wire L2.

When the solenoids 108, 110 are so energized, the valve members 90, 98 will be moved to their open positions against the bias of the springs 96, 104, which action provides parallel paths for the flow of fuel to the chamber 84 and the burner 16. The first fuel path is traced as follows: From passageway 66, through conduit 22 into the chamber 82, through opening 86 into the chamber 84 to the burner 16 by way of the conduit 78. The second fuel path is traced as follows: From passageway 66, through conduit 22 into the chamber 82, through the opening 88 into chamber 84 to the burner 16 by way of the conduit 78.

The fuel present at the burner 16 is ignited by the pilot burner 20 and the burner 16 is operative at full capacity which occurs with gas supplied proportionately by the opening of the two solenoid valve members 90, 98. In this manner, the two parallel feed paths provide a full or maximum heating rate at the burner 16 as soon as the same is turned "on" and a temperature setting of the control knob 132 is made.

The heat from the burner 16 acts upon the utensil 12 and its contents in the usual manner. As will be apparent, the temperature of the cooking vessel 12 rises causing expansion of the power element 120. Expansion of the power element 120 will move the thrust button 122 into engagement with the block 146 to swing the switch arm 142 in a clockwise direction against the bias of the flexure plate 144 and thereby move the contact 138 out of engagement with the fixed contact 134.

Opening of the contacts 134, 138 will break the circuit to the solenoid coil 112 to deenergize the same causing the closing of the valve member 90 under the action of the spring 96. At this stage of the operation, the contacts 136, 140 are still in engagement and the coil 114 continues to be energized to maintain the valve member 98 in open position. Accordingly, fuel is supplied to the burner 16 through the reduced opening 88 only and in a reduced amount, resulting in continued heating of the utensil 12 at a slower rate.

As the temperature of the vessel 12 rises as a result of the slower rate of fuel input to the burner 16, the temperature rise is sensed by the sensing element 14 and the power element 120 continues to expand. The continued expansion of the power element 120 moves the block 154 into engagement with the screw 152 carried on the switch arm. When the desired temperature of the utensil 12, as set previously by the knob 132, is reached, the power element 120 will have expanded sufficiently to impart movement to the screw 152 to move the switch arm 148 against the bias of the flexure plate 150 and separate the contacts 136, 140. Opening of the contacts 136, 140 will open the circuit to the solenoid coil 114 to deenergize the same and permit the valve member 98 to close under pressure from the spring 104. This action shuts off all fuel supplied to the burner 16 and further heating of the utensil 12 is temporarily prevented.

It will be apparent that if the temperature of the utensil 12 remains at or above the desired or set temperature, the power element 120 will remain sufficiently expanded to maintain the control lever 148 in a position which separates the contacts 136, 140 so that both solenoid coils 112, 114 will remain deenergized, and fuel supply to the burner 16 will be prevented. As the temperature of the vessel 12, as sensed by the bulb 14, drops, the power element 120 will contract to permit the switch arm 148 to move downward under the bias of the flexure plate 150. This movement of the switch arm 148 will move the contact 140 into engagement with the contact 136 to once again complete the circuit for the solenoid coil 114 to open the valve member 98 and again supply fuel to the burner 16 at a reduced rate. The burner 16 will thus by cycled by the repeated energization and deenergization of the solenoid coil 114 as the contacts 136, 140 make and break the circuit to the same.

If the temperature of the utensil 12 drops sufficiently below the desired set temperature, or in the event that the reduced heat input is not sufficient to restore the desired temperature, the power element 120 will contract further to permit the control arm 142 to move the movable contact 138 into engagement with the fixed contact 134 thereby completing the circuit to the solenoid coil 112. Such energization will move the valve member 90 to its open position to provide a full supply of fuel to the surface burner 16. In this event, both fuel paths through the valve assembly 70 are then effected as both valve members 90, 98 are in their open position, permitting fuel to be supplied at the burner 16 at a maximum rate.

It was assumed in the foregoing description of operation that the flow adjusting and shutoff cock 68 was positioned to allow maximum fuel flow therethrough. This would usually be the case when relatively large cooking vessels are used. In the event a small quantity of food is to be heated in a correspondingly small vessel whereby it would be necessary to utilize a low flame, the cock 68 is adjusted to allow a proportionately lesser amount of fuel to flow therethrough without effecting the ratio of fuel flow through the valves 90, 98. In other words, when both valve members 90, 98 are in open position, the amount of fuel flowing through the same will be equal to that flowing through the cock 68, and, when the valve member 90 is in closed position, the flow of fuel through the valve member 98 will be reduced with respect to what could flow through the cock 68.

From this, it will be apparent that the disclosed invention is adapted for thermostatically regulating fuel flow to a top burner between minimum and maximum fuel capacities thereof, and that any size vessel may be utilized to effect cooking of any quantity of food that the burner is capable of properly heating.

From the foregoing, it will be apparent that the disclosed system provides a means for thermostatically controlling a surface burner where fuel is consumed and heat supplied only as required. The improved thermostatic control device also provides a means for controlling the flow of fuel to a surface burner that is most economical from the standpoint of fuel consumption, construction and maintenance. The disclosed system is controlled by electromechanical action rather than by purely mechanical operation, thus the system is effective without respect to or limited by burner size or shape or with restriction as to the relative location of the reversal elements of the system.

While only one embodiment of the invention has been herein shown and described, it will be obvious to those skilled in the art that the invention may be variously embodied and that changes may be made in the construction and arrangement of parts without departing from the scope of the invention as defined in the appended claims.

I claim:
1. In a control system for apparatus having a surface burner adapted to heat a cooking vessel, the combination comprising a pair of electrically operable valves movable between open and closed positions for controlling a fuel supply to the burner, temperature responsive means for controlling the operation of said valves including a sensing means adapted to respond to the temperature of the cooking vessel and an expansible element remote from but responsive to variations in temperature affecting said sensing means, a pair of switch means operable in sequence by said expansible element upon said temperature variations and being normally biased closed, means for establishing an energizing circuit for said pair of valves in said closed position of said switch means for supplying fuel at a maximum rate to the burner, said temperature responsive means being operable at a predetermined temperature of the cooking vessel for opening one of said switch means to de-energize one of said valves for supplying fuel at a reduced rate to the burner, and for intermittently opening and closing the other said switch means at another predetermined temperature for supplying fuel intermittently to the burner, and means operably connected to said expansible element for adjusting the same relative to said switch means for setting said other predetermined temperature.

2. In a control system for apparatus having a surface burner adapted to heat a cooking vessel, the combination comprising a pair of electrically operable valves movable between open and closed positions for controlling a fuel supply to the burner, temperature responsive means for controlling the operation of said valves including a sensing means adapted to respond to the temperature of the cooking vessel and an expansible element remote from but responsive to variations in temperature affecting said sensing means, a pair of switch means operable by said expansible element upon said temperature variations and being normally biased closed, said switch means being connected through a lost-motion arrangement therebetween for sequential operation between an open and said closed positions, means for establishing an energizing circuit for said pair of valves in said closed position of said switch means for supplying fuel at a maximum rate to the burner, said temperature responsive means being operable at a predetermined temperature of the cooking vessel for opening one of said switch means to de-energize one of said valves for supplying fuel at a reduced rate to the burner, said lost-motion arrangement being effective for opening the other said switch means upon said temperature responsive means responding to another predetermined temperature and thereafter effecting an intermittent closing and opening of said other switch means for supplying fuel intermittently to the burner, and normally operable means operable connected to said expansible element for adjusting the same relative to said switch means for setting said other predetermined temperature.

References Cited in the file of this patent

UNITED STATES PATENTS

| | | |
|---|---|---|
| 947,914 | Junkers | Feb. 1, 1910 |
| 1,918,265 | Hartwig | July 18, 1933 |
| 1,991,807 | Kriechbaum | Feb. 19, 1935 |
| 2,179,846 | Finnigan | Nov. 14, 1939 |
| 2,223,283 | Grant | Nov. 26, 1940 |
| 2,456,864 | Cole | Dec. 21, 1948 |
| 2,461,608 | Laing | Feb. 15, 1949 |
| 2,549,461 | Haller | Apr. 17, 1951 |
| 2,585,477 | Leslie | Feb. 12, 1952 |
| 2,699,487 | Turner | Jan. 11, 1955 |
| 2,781,038 | Sherman | Feb. 12, 1957 |